United States Patent [19]

Kraus

[11] Patent Number: 4,693,134
[45] Date of Patent: Sep. 15, 1987

[54] HIGH-POWERED VEHICLE DRIVE TRAIN
[75] Inventor: Charles E. Kraus, Austin, Tex.
[73] Assignee: Excelermatic Inc., Austin, Tex.
[21] Appl. No.: 746,643
[22] Filed: Jun. 20, 1985
[51] Int. Cl.$^4$ .................. F16H 37/06; F16H 15/08
[52] U.S. Cl. .................................. 74/690; 74/200; 74/796
[58] Field of Search .............. 74/690, 681, 720.5, 74/200, 796, 201

[56] References Cited

U.S. PATENT DOCUMENTS

| | | | |
|---|---|---|---|
| 1,985,110 | 12/1934 | Sharpe | 74/690 X |
| 2,060,884 | 11/1936 | Madle | 74/200 X |
| 2,164,504 | 7/1939 | Dodge | 74/796 X |
| 3,071,018 | 1/1963 | Floyd | 74/198 |
| 3,244,025 | 4/1966 | Francisco | 74/690 |
| 3,277,745 | 10/1966 | Harned et al. | 74/200 X |
| 3,299,743 | 1/1967 | Stockton | 74/690 |
| 3,299,744 | 1/1967 | Kraus | 74/690 X |
| 3,302,474 | 2/1967 | Edlich | 74/200 |
| 3,365,982 | 1/1968 | Floyd | 74/690 |
| 3,439,563 | 4/1969 | Petty | 74/796 X |
| 3,826,148 | 7/1974 | Magill | 74/200 |
| 4,019,404 | 4/1977 | Schauer | 74/720.5 X |
| 4,086,820 | 5/1978 | Kraus et al. | 74/200 |
| 4,297,918 | 11/1981 | Perry | 74/796 X |
| 4,355,547 | 10/1982 | Poole et al. | 74/690 |
| 4,382,188 | 5/1983 | Cronin | 74/690 X |
| 4,484,487 | 11/1984 | Kraus | 74/200 |
| 4,553,450 | 11/1985 | Gizard | 74/681 X |
| 4,569,251 | 2/1986 | Greenwood | 74/720.5 X |
| 4,628,766 | 12/1986 | de Brie Perrt | 74/796 X |

FOREIGN PATENT DOCUMENTS

| | | | |
|---|---|---|---|
| 592125 | 2/1934 | Fed. Rep. of Germany | 74/690 |
| 2736581 | 2/1978 | Fed. Rep. of Germany | 74/200 |
| 957145 | 5/1964 | United Kingdom | 74/690 |

Primary Examiner—Leslie Braun
Assistant Examiner—Joseph M. Rolnicki

[57] ABSTRACT

A high power-to-weight ratio vehicle whose drive train includes an engine with an infinitely variable transmission coupled thereto and the transmission output shaft connected to the vehicle drive wheels has a transmission with a planetary gear structure whose ring gear is mounted for rotation with the transmission input shaft, whose planetary gears are mounted on a carrier associated with the transmission output shaft and whose sun gear is mounted on a hollow shaft which has one toroidal disc of a toric traction roller transmission mounted thereon while the other toroidal disc of the toric traction roller transmission which is disposed adjacent the one disc and in engagement therewith through pivotally supported traction rollers is mounted on the transmission input shaft such that the traction roller transmission is at the highest speed-up ratio for lowest vehicle speed.

3 Claims, 3 Drawing Figures 4,693,134

HIGH-POWERED VEHICLE DRIVE TRAIN

BACKGROUND OF THE INVENTION

The invention relates to a drive train for a vehicle with a relatively high power engine and relatively low weight such as a race car.

Such vehicles are basically highly overpowered. Generally, the full power cannot be applied to the wheels during low speed acceleration, that is, torque transmission must be limited since, otherwise, the driven wheels would slip and, thereby, only reduce the amount of forces available for acceleration of the car. Furthermore, such cars have to cover a large speed range and the high-powered engines are highly tuned for certain power and speed ranges so that it is important for the transmission to accurately ratio-match the engine power tuning for good and efficient engine performance. Race car transmissions have generally five gears to cover the full forward vehicle speed range and as a result make it quite impossible to maintain the engines at optimum speed.

Transmissions with split-torque arrangements in which only part of the torque is transmitted through the transmission speed changing structure and/or a torque converter while the other part is directly transmitted to the drive wheels by mechanical gearing, have been in use. Also transmission arrangements of this type in which, instead of a hydraulic torque converter and/or ratio changing structure, an infinitely variable transmission is used, have become known. Since, however, vehicles require the largest torque at the wheels during low speed acceleration, such transmission structures are always set up for torque recirculation through the gear train loop in order to provide the desired torque at the drive wheels with low vehicle and elevated engine speeds. Such gearing is widely used with torque converters in automobile transmissions and with hydrostatic drives for many industrial applications. If used in such an arrangement in direct regeneration, a Constantly Variable Drive (CVD) is in low ratio when the output speed is low and the CVD changes toward speed-up as the output rpm increases. In this case the transmission output speed range is wider than the CVD output speed range but results in relatively high CVD load because of torque recirculation and results in high CVD loading at higher vehicle operating speeds.

SUMMARY OF THE INVENTION

In a high power-to-weight ratio vehicle the engine has an infinitely variable transmission associated therewith for transmitting engine power to the drive wheels. The transmission has an input shaft which is coupled to the engine and carries the ring gear of a planetary gear structure whose planetary gears are supported on a planetary gear carrier which is operatively connected to the transmission output shaft while the sun gear is mounted on one end of a hollow shaft which carries at its other end one of the toroidal discs of an infinitely variable toroidal traction roller transmission while the other of the toroidal discs is mounted on the end of the transmission input shaft which extends through the hollow shaft. In this arrangement the sun gear rotates in a direction opposite to that of the ring gear so that the planetary gears orbit, and the output shaft rotates, at the slowest speed when the traction roller transmission is in the highest speed-up position.

At the lowest CVD transmission ratio at which the CVD output shaft rotates slowest, the transmission output shaft is fastest. The CVD theoretically might be heavily loaded at or near zero transmission output shaft speed since an extremely high torque would be available at the transmission output shaft, however, such high torque is not applicable to the wheels of a relatively light vehicle and, in any case, a vehicle such as a race car is used at low speeds only for very short periods. The CVD therefore need not be designed for the highest theoretical output torque; it rather may be designed for high vehicle speed operating conditions at which the CVD output shaft is at low or medium speed where the torque to be transmitted through the CVD is at its lowest or medium level. As a result the CVD needs to be designed for only a relatively low load and, consequently, is small, light, relatively inexpensive and also quite durable.

SHORT DESCRIPTION OF THE DRAWINGS

DESCRIPTION OF THE PREFERRED EMBODIMENT

Figure 1:
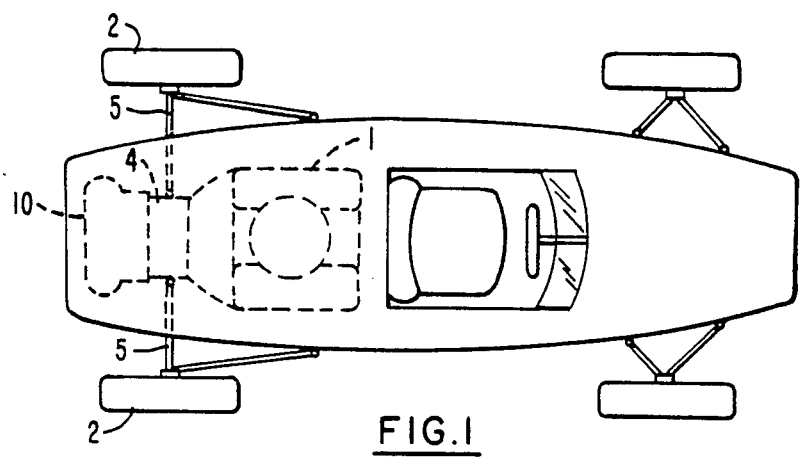
FIG. 1 is a schematic top view of a vehicle provided with a drive train including a CVD.

FIG. 1 shows schematically a race car having rear wheel drive with the engine 1 disposed in front of the rear drive wheels 2, the tranmission 10 disposed behind the rear drive wheels 2 and a differential 4 arranged between the two with half shafts 5 extending from the differential to the wheels 2 for driving the wheels.

Figure 2:
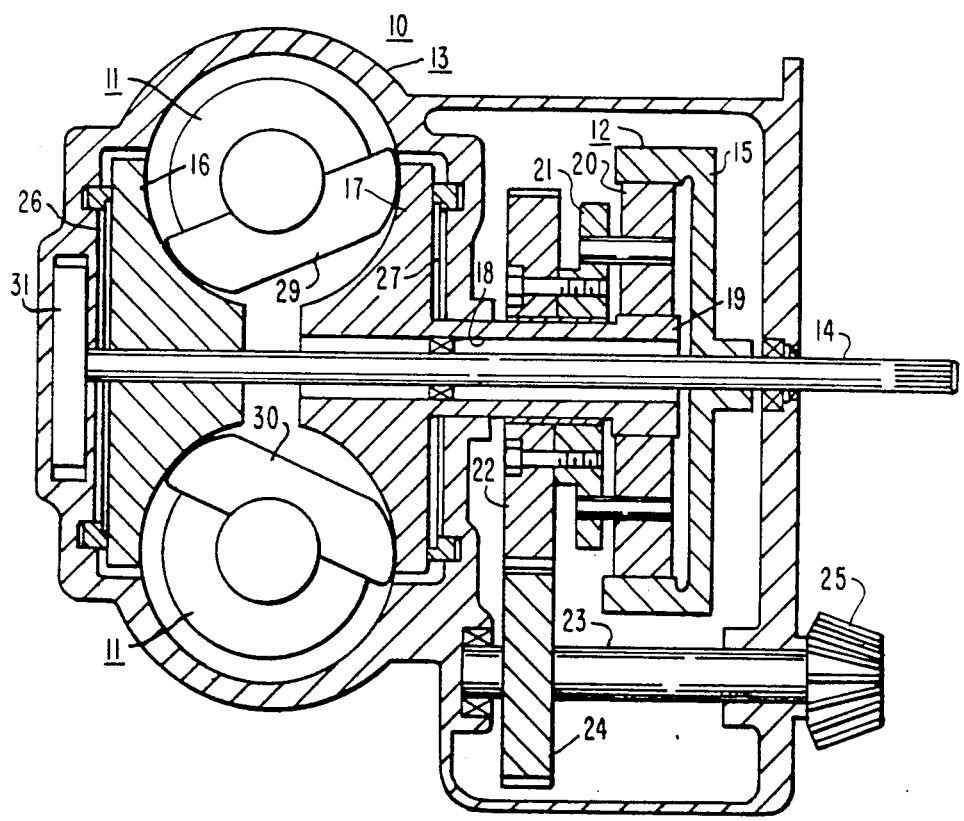
FIG. 2 is a cross-sectional view of one embodiment of the vehicle drive train transmission.

FIG. 2 shows in cross-section the transmission 10 consisting of an infinitely variable traction roller transmission 11 of the type disclosed in the applicant's U.S. Pat. Nos. 4,086,820 or 4,484,487 combined with a planetary gear structure 12, all disposed in a housing 13.

The transmission 10 has an input shaft 14 which engages the engine clutch in the usual manner. The input shaft 14 extends through the transmission and has the ring gear 15 of the planetary gear structure 12 mounted thereon for rotation therewith. At its free end, the input shaft 14 carries one toroidal disc 16 of the infinitely variable traction roller transmission 11 while the other toroidal disc 17 is mounted on one end of a hollow shaft 18 through which the input shaft 14 extends. At its other end, the hollow shaft 18 carries the sun gear 19 of the planetary gear structure 12. A number of planetary gears 20 which are disposed in the annular space between, and in engagement with, the ring gear 15 and the sun gear 19 are mounted on a planetary gear carrier 21 which is rotatably supported on the hollow shaft 18 and carries a spur gear 22. An output shaft 23, which is rotatably supported in the housing 12, has an output spur gear 24 mounted thereon in engagement with the spur gear 22 and carries, outside the housing 12, a pinion gear 25 for engagement with the differential gear structure when the transmission is mounted to the car's differential.

As it is known in the art both toroidal discs 16 and 17 are provided with hydrostatic axial bearing structures 26 and 27 adapted to provide the axial thrust forces necessary for the engagement of the pivotal traction rollers 29 and 30 with the toroidal discs 16 and 17. At the end of the drive shaft 14 there is provided an oil pump 31 which is needed to supply the oil pressure for transmission operation, especially for the hydrostatic bearing structures and for transmission ratio control. The housing 13 is mounted directly to the differential 4 which in turn is mounted on the clutch housing of the engine as it is customary in rear wheel drive rear engine cars. It is mounted only by four bolts and preferably arranged behind the rear axle so that it can be easily and rapidly moved back out from the car and replaced by a new transmission if such change should become necessary during a race. With the given arrangement a transmission exchange may be performed actually in less than a minute if all necessary connections such as hydraulic lines are simply slide-in connections.

Operation

Rotation by the engine 1 of the input shaft 14 and, together therewith, of the ring gear 15 and the toroidal disc 16 in one direction causes rotation of the toroidal disc 17 and the sun gear 19 in the opposite direction. As the circumferential speed of the ring gear 15 is substantially higher than the oppositely directed circumferential speed of the sun gear, the planetary gears 20 will be moved around the sun gear 19 in the same direction as the ring gear, though at reduced speed, and carry along the planetary gear carrier 21 and the spur gear 22 which drives the output gear 24, shaft 23 and pinion gear 25. The speed of the sun gear 19 relative to the ring gear 15 is adjustable by changing the transmission ratio of the infinitely variable traction roller transmission 11.

If, as shown in FIG. 2, the pivot position of the traction rollers is at full speed reduction, the speed of the toroidal disc 17 and of the sun gear 19 in counter direction with respect to the ring gear is relatively low so that the transmission output shaft is at high speed. Upon change of the transmission ratio such that the speed of the sun gear 19 in counter-rotating direction is very high relative to the ring gear 15 then the planetary gears 20 orbit and their carrier 21 and the spur gear 22 rotate relatively slowly. Actually, the counter-rotation speed of the sun gear could be such that its circumferential speed in counter direction is greater than the circumferential speed of the ring gear and then the planetary gears would orbit and the planetary gear carrier 21 and the spur gear 22 would rotate in the same direction as the sun gear, that is, the output shaft 23 would be in reverse. In the arrangement as shown in FIG. 2, this would be the case if the ratio of the diameters of the largest circle of contact between toroidal disc 16 and the traction rollers 29, 30 and of the smallest circle of contact between the toroidal disc 17 and the traction rollers 29, 30 would be greater than the ratios of ring gear diameter and sun gear diameter. However, since reverse operation is not necessary for the racing application, in the arrangement according to FIG. 2 reverse operation is not achievable. It is noted, however, that it could easily be obtained simply by increasing the diameter of the sun gear 19 though at the expense of forward speed variation range.

Figure 3:
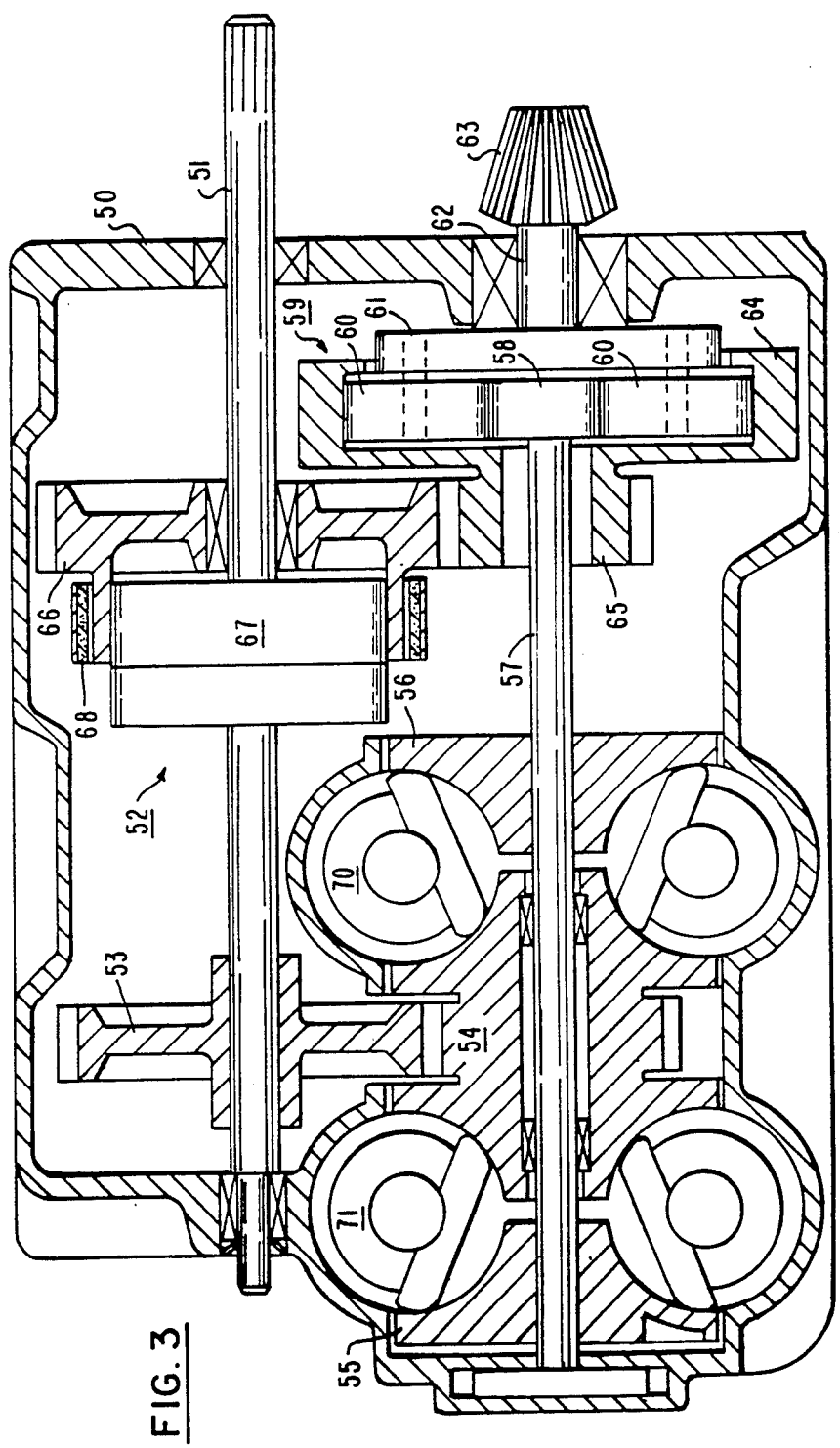
FIG. 3 shows another embodiment of the vehicle drive train transmission.

Although the same in principle, the transmission as shown in FIG. 3 is different in structure from that according to FIG. 2. An input shaft 51 to be coupled with the engine's output shaft is rotatably supported in the transmission housing 50 within which it has associated therewith a main clutch structure 52 and a first gear 53 mounted thereon for rotation therewith. The gear 53 is in engagement with the input toric disc structure 54 of a twin toroidal traction roller transmission which has its output toric discs 55, 56 mounted on an intermediate shaft 57 which carries at one end the sun gear 58 of a planetary type transmission 59. The planetary type transmission has its planetary gears or rollers 60 rotatably supported on a carrier 61 connected to the transmission output shaft 62 which carries outside the transmission housing a pinion gear 63 for engagement with the differential gearing. The ring 64 of the planetary type transmission is rotatably supported on the intermediate shaft 57 and carries a gear 65 which is in engagement with a drive gear 66 that is rotatably supported on the input shaft 51. The clutch structure 52 includes for example clutch plate structures 67 for engaging the gear 66 with the input shaft 51. There is also provided a band brake 68 for engaging the gear 66 to prevent its rotation for reverse operation during which period however the clutch 67 must be disengaged to permit standstill of the gear 66.

The traction roller transmission is a twin structure because of the high power (800 IHP) to be handled by the drive when used in a race car. Both toroidal traction roller transmission structures operate in parallel and in the same manner as the one shown in FIG. 2 and are therefore not described in detail.

The operation of this transmission is also similar to the one of FIG. 2. When installed in a race car, the car's engine is directly coupled to the input shaft 51, the clutch 67 serving as a main clutch for transmitting power through the drive gear 66 to the planetary transmission ring 64. The input shaft 51 also drives the toric disc structure 54 by way of the gear 53. The twin traction roller transmission structure 71 transmits motion to the intermediate shaft 57 so as to operate the sun roller 58 at a speed which depends on the transmission ratio set by the traction roller transmission structure. The ring 64 of the planetary transmission 59 is rotated together with the gear 65 when clutch 67 is engaged in a direction opposite, and at a speed corresponding to, that of the input shaft 51. The ratios are so selected that the circumferential speed of the sun gear 58 in a direction opposite to that of the ring 64 is always substantially lower than that of the ring 64 so that the output shaft 62 will generally rotate in forward direction. This provides for a relatively large forward speed ratio change capability above zero output speed. For reverse operation, clutch 67 is disengaged and a reverse band brake 68 is operated so as to hold the gear 66 and the ring 64 stationary such that the planetary carrier 61 and the output shaft 62 are rotated in the same direction as the sun roller, however at substantially lower speed, that is, in low speed reverse. Although reverse operation is often not used in conjunction with race cars, the reverse capability is obtainable with the arrangement according to FIG. 3 with few additional components and only little increase in weight and expense. Full disengagement is also achievable with this transmission by disengagement of clutch 67 and at the same time of brake 68. The drive gear 66 is then permitted to rotate freely together with the planetary transmission ring 64 and the planetary members 60 such that no torque is transmitted through the transmission. No main engine clutch is needed with this arrangement.

The drive train according to the invention was specifically developed for a race car with an engine of 750 HP at 9000 rpm and a car weight of about 1500 lbs. The main factor that makes the arrangement according to the invention viable and in fact advantageous is the relatively large engine power to car weight ratio which limits the power applicable to the driving wheels during low speed to only a fraction of the available engine power. It is noted that in the computer printout the wheel thrust is limited to 1600 lbs. This is about the amount achievable by the wheels before slipping. Consequently, also the torque transmitted through the traction roller transmission is limited.

The advantages of the arrangement according to the invention are of great importance especially for a race car: The CVD is never subjected to more than half of engine power and therefore is relatively small and light. At low speed when the CVD takes a larger share of the load the load is limited by wheel slip; at high speed the CVD carries only about 15% of the load and the 85% carried by the planetary gear structure involves only minimum losses. This makes efficiencies of up to 98% possible. Race car transmissions are generally highly stressed and normally have a short life of maybe half a dozen races or even less. Since the CVD carries little power at high speeds and the high stress low speeds are used only for short periods of time, a relatively long transmission life can be expected and this with a continuously variable transmission whose transmission ratio may be adjusted exactly to the ratio most suitable for any particular operating condition.

I claim:

1. A vehicle comprising: an engine having an infinitely variable transmission operatively coupled thereto for transmitting engine power to the transmission's input shaft, with the transmission output shaft being operatively connected to the vehicle's drive wheels, said transmission comprising a planetary drive structure including a drive ring gear carrying a first gear in engagement with a drive gear on said input shaft for rotation of said drive ring gear with said input shaft, a central sun gear and planetary gear members disposed in the annular space between, and in engagement with, said drive ring gear and said sun gear and rotatably supported on a planetary carrier which is supported for rotation with the transmission output shaft and an infinitely variable toroidal traction roller transmission structure including two parallel toroidal transmissions having a central input toric disc structure common to both toroidal transmissions and operatively connected to said input shaft, the output toric discs being mounted on a shaft associated with the sun gear of said planetary drive, each of said two parallel toroidal transmissions having oppositely disposed toroidal traction discs with traction rollers pivotally supported therebetween and in engagement therewith for the transmission of motion in opposite directions of rotation and at a transmission ratio which depends on the pivot position of said traction rollers, said input shaft being supported parallel to and spaced from the output shaft and said input toric disc structure being provided with a second gear in engagement with a third gear on said input shaft for rotation therewith and the output toric discs being operatively connected to said sun gear for driving said sun gear in a direction opposite to that of said ring gear and at a speed which depends on the pivot position of said traction rollers for controlling the orbit speed of said planetary gears and, together therewith, of said output shaft, said drive gear being rotatably mounted on said input shaft and provided with a clutch allowing selective engagement of said drive gear with said input shaft for rotation therewith, said drive gear also having braking means for locking said drive gear.

2. A vehicle comprising: an engine having an infinitely variable transmission operatively coupled thereto for transmitting engine power to the transmission's input shaft, with the transmission output shaft being operatively connected to the vehicle's drive wheels, said transmission comprising a planetary gear structure including a ring gear mounted for rotation with said input shaft, a central sun gear and planetary gears disposed in the annular space between, and in engagement with, said ring gear and said sun gear and rotatably supported on a planetary gear carrier which is supported for rotation with the transmission output shaft and an infinitely variable toroidal traction roller transmission having oppositely disposed toroidal traction discs with traction rollers pivotally supported therebetween and in engagement therewith for the transmission of motion in opposite directions of rotation and at a transmission ratio which depends on the pivot position of said traction rollers, a parallel shaft being supported parallel to and spaced from said output shaft and carrying a first gear in engagement with a gear on one of said toroidal traction discs and a second gear disposed in engagement with a gear associated with said ring gear, the other toroidal disc being operatively connected to said sun gear for driving said sun gear in a direction opposite to that of said ring gear and at a speed which depends on the pivot position of said traction rollers for controlling the orbit speed of said planetary gears and, together therewith, of said output shaft, said second gear being rotatably mounted on said parallel shaft and being provided with a clutch allowing selective engagement of said second gear with said parallel shaft for rotation therewith, said second gear also having braking means for locking said second gear.

3. A vehicle according to claim 2, wherein said parallel shaft is a power input shaft operatively coupled to the vehicle's engine.

* * * * *